(12) United States Patent
Deshpande

(10) Patent No.: US 9,591,317 B2
(45) Date of Patent: Mar. 7, 2017

(54) IMPLICIT SIGNALING OF SCALABILITY DIMENSION IDENTIFIER INFORMATION IN A PARAMETER SET

(71) Applicant: DOLBY INTERNATIONAL AB, Amsterdam Zuidoost (NL)

(72) Inventor: Sachin G. Deshpande, Camas, WA (US)

(73) Assignee: DOLBY INTERNATIONAL AB, Amsterdam Zuidoost (NL)

( * ) Notice: Subject to any disclaimer, the term of this patent is extended or adjusted under 35 U.S.C. 154(b) by 0 days.

(21) Appl. No.: 15/236,766

(22) Filed: Aug. 15, 2016

(65) Prior Publication Data
US 2016/0353119 A1 Dec. 1, 2016

Related U.S. Application Data

(63) Continuation of application No. 15/040,600, filed on Feb. 10, 2016, now Pat. No. 9,462,289, which is a
(Continued)

(51) Int. Cl.
| | |
|---|---|
| H04N 19/36 | (2014.01) |
| H04N 19/70 | (2014.01) |
| H04N 19/174 | (2014.01) |
| H04N 19/187 | (2014.01) |
| H04N 19/30 | (2014.01) |
| H04N 19/44 | (2014.01) |
| H04N 19/124 | (2014.01) |
| H04N 19/13 | (2014.01) |
| H04N 19/159 | (2014.01) |
| H04N 19/172 | (2014.01) |
| H04N 19/182 | (2014.01) |
| H04N 19/39 | (2014.01) |
| H04N 19/43 | (2014.01) |

(Continued)

(52) U.S. Cl.
CPC .......... *H04N 19/36* (2014.11); *H04N 19/124* (2014.11); *H04N 19/13* (2014.11); *H04N 19/159* (2014.11); *H04N 19/172* (2014.11); *H04N 19/174* (2014.11); *H04N 19/182* (2014.11); *H04N 19/187* (2014.11); *H04N 19/30* (2014.11); *H04N 19/39* (2014.11); *H04N 19/43* (2014.11); *H04N 19/44* (2014.11); *H04N 19/61* (2014.11); *H04N 19/68* (2014.11); *H04N 19/70* (2014.11); *H04N 19/31* (2014.11); *H04N 19/33* (2014.11); *H04N 19/37* (2014.11)

(58) Field of Classification Search
CPC ....................................................... H04N 19/36
USPC .................................................... 375/240.25
See application file for complete search history.

(56) References Cited

U.S. PATENT DOCUMENTS

| | | | |
|---|---|---|---|
| 2013/0034170 A1* | 2/2013 | Chen ...................... | H04N 13/00 375/240.25 |
| 2014/0072038 A1* | 3/2014 | Samuelsson ......... | H04N 19/503 375/240.12 |

OTHER PUBLICATIONS

B. Bross et al., "High efficiency video coding (HEVC) text specification draft 8," JCTVC-J1003, 10th Meeting, Stockholm, SE, Jul. 11-20, 2012, 50 pgs_, Part 1.
(Continued)

*Primary Examiner* — Yulin Sun
(74) *Attorney, Agent, or Firm* — Fish & Richardson P.C.

(57) ABSTRACT

A system for decoding a video bitstream includes receiving a frame of the video that includes at least one slice and at least one tile and where each of the at least one slice and the at least one tile are not all aligned with one another.

20 Claims, 31 Drawing Sheets

Related U.S. Application Data continuation of application No. 14/145,627, filed on Dec. 31, 2013, now Pat. No. 9,462,287.

(60) Provisional application No. 61/749,173, filed on Jan. 4, 2013.

(51) Int. Cl.
  *H04N 19/61* (2014.01)
  *H04N 19/68* (2014.01)
  *H04N 19/37* (2014.01)
  *H04N 19/33* (2014.01)
  *H04N 19/31* (2014.01)

(56) References Cited

OTHER PUBLICATIONS

B. Bross et al., "High efficiency video coding (HEVC) text specification draft 8," JCTVC-J1003, 10th Meeting, Stockholm, SE, Jul. 11-20, 2012, 50 pgs_, Part 2.

B. Bross et al., "High efficiency video coding (HEVC) text specification draft 8," JCTVC-J1003, 10th Meeting, Stockholm, SE, Jul. 11-20, 2012, 50 pgs_, Part 3.

B. Bross et al., "High efficiency video coding (HEVC) text specification draft 8," JCTVC-J1003, 10th Meeting, Stockholm, SE, Jul. 11-20, 2012, 50 pgs_, Part 4.

B. Bross et al., "High efficiency video coding (HEVC) text specification draft 8," JCTVC-J1003, 10th Meeting, Stockholm, SE, Jul. 11-20, 2012, 50 pgs_, Part 5.

B. Bross et al., "High efficiency video coding (HEVC) text specification draft 8," JCTVC-J1003, 10th Meeting, Stockholm, SE, Jul. 11-20, 2012, 10 pgs_, Part 6.

Y.-K. Wang, "BoG on high-level syntax for extension planning," JCTVC-J0574, Stockholm, Jul. 2012, 17 pgs.

M.M. Hannuksela (Nokia), "AHG10 Hooks for Scalable Coding: Video Parameter Set Design," JCTVC-J0075, Stockholm, Jul. 2012, 9 pgs.

Y. Chen, Y.-K. Wang (Qualcomm), "AHG10: On video parameter set for HEVC extensions," JCTVC-J0124, Stockholm, Jul. 2012, 15 pgs_.

J. Boyce (Vidyo), "VPS syntax for scalable and 3D extensions," JCTVC-J0576, Stockholm, Jul. 2012, 3 pgs.

B. Choi, JJ. Kim, JJ. Park (Samsung), On NAL Unit Header and Video Parameter Set Design, JCTVC-J0432, Stockholm, Jul. 2012, 3 pgs_.

R. Skupin, V. George, T. Schierl, "AHG9/AHG10: Design of the video Parameter Set," JCTVC-J0257, J0257, Stockholm, Jul. 2012, 17 pgs.

\* cited by examiner

| nal_unit_header( ) { | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

NAL UNIT HEADER SYNTAX

FIG. 9A

| nal_unit_header( ) { | Descriptor |
|---|---|
| forbidden_zero_bit | f(1) |
| nal_unit_type | u(6) |
| layer_id_plus1 | u(6) |
| nuh_temporal_id_plus1 | u(3) |
| } | |

NAL UNIT HEADER SYNTAX

FIG. 9B

| nal_unit_header( ) { | Descriptor |
|---|---|
| forbidden_zero_bit | f(1) |
| nal_unit_type | u(6) |
| layer_id | u(6) |
| nuh_temporal_id_plus1 | u(3) |
| } | |

NAL UNIT HEADER SYNTAX

FIG. 9C

| nal_unit( NumBytesInNALunit ) { | Descriptor |
|---|---|
|   nal_unit_header( ) | |
|   NumBytesInRBSP = 0 | |
|   for( i = 2; i < NumBytesInNALunit; i++ ) { | |
|     if( i + 2 < NumBytesInNALunit && next_bits( 24 ) == 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

GENERAL NAL UNIT SYNTAX

FIG. 10

| vps_extension( ) { | Descriptor |
|---|---|
|   while( !byte_aligned( ) ) | |
|     vps_extension_byte_alignment_reserved_zero_bit | u(1) |
|   // scalability type and layer_id partitioning method | |
|   scalability_type | u(4) |
|   for( i = 0; i < MaxDim( scalability_type ); i++ ) | |
|     layer_id_dim_len[ i ] | u(3) |
|   // layer specific information | |
|   for( i = 0; i <= max_num_layers_minus1; i++ ) { | |
|     vps_layer_id[ i ] | u(6) |
|     // layer dependency | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Existing video parameter set extension syntax

FIG. 11

| scalability_type | MaxDim(scalability_type) | Scalability dimensions |
|---|---|---|
| 0 | 1 | none (base HEVC) |
| 1 | 2 | spatial and quality |
| 2 | 3 | spatial, quality, unspecified |
| 3 | 4 | spatial, quality, unspecified, unspecified |
| 4 | 2 | multiview and depth |
| 5 | 3 | multiview, depth, unspecified |
| 6 | 4 | multiview, depth, unspecified, unspecified |
| 7 | 4 | multiview, spatial, quality and depth |
| 8 | 5 | multiview, spatial, quality, depth, unspecified |
| 9 | 6 | multiview, spatial, quality, depth, unspecified, unspecified |
| 10...15 | reserved | reserved |

Existing Scalability Types

FIG. 12

| vps_extension( ) { | Descriptor |
|---|---|
|   while( !byte_aligned( ) ) | |
|     vps_extension_byte_alignment_reserved_zero_bit | u(1) |
|   // Scalability map and layer_id_plus1 mapping method | |
|   for (i=0;i<= max_num_layers_minus1_bits; i++ ) { | |
|     scalability_map[i] | u(3) |
|   } | |
|   // layer specific information | |
|   for( i = 0; i <= max_num_layers_minus1; i++ ) { | |
|     vps_layer_id[ i ] | u(6) |
|     // layer dependency | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video parameter set extension syntax

FIG. 13

| Scalability_map[ i ] | Scalability dimension |
|---|---|
| 0 | none (base HEVC) |
| 1 | spatial |
| 2 | quality |
| 3 | depth |
| 4 | multiview |
| 5 | unspecified |
| 6, 7 | reserved |

Scalability Map Syntax

FIG. 14

| vps_extension( ) { | Descriptor |
|---|---|
|   while( !byte_aligned( ) ) | |
|     vps_extension_byte_alignment_reserved_zero_bit | u(1) |
|   // scalability map and layer_id_plus1 mapping method | |
|   num_scalability_dimensions_minus1 | u(3) |
|   for(i=0;i<= num_scalability_dimensions_minus1; i++) { | |
|     scalability_map[i] | u(3) |
|     num_bits_for_scalability_map[i] | u(3) |
|   } | |
|   // layer specific information | |
|   for( i = 0; i <= max_num_layers_minus1; i++ ) { | |
|     vps_layer_id[ i ] | u(6) |
|     // layer dependency | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video parameter set extension syntax

FIG. 15

| vps_extension( ) { | Descriptor |
|---|---|
|   while( !byte_aligned( ) ) | |
|     vps_extension_byte_alignment_reserved_zero_bit | u(1) |
|   // layer specific information | |
|   for( i = 1; i <= vps_max_layers_minus1; i++ ) { | |
|     // mapping of layer ID to scalability dimension IDs | |
|     num_dimensions_minus1[ i ] | u(4) |
|     for( j = 0; j <= num_dimensions_minus1; j++ ) { | |
|       dimension_type[ i ][ j ] | u(4) |
|       dimension_id[ i ][ j ] | u(8) |
|     } | |
|     // layer dependency | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Existing video parameter set extension syntax

FIG. 16

| dimension_type[ i ][ j ] | dimension_id[ i ][ j ] |
|---|---|
| 0 | view order idx |
| 1 | depth flag |
| 2 | dependency ID |
| 3 | quality ID |
| 4..15 | reserved |

Existing Dimension Type, Dimension ID Syntax

FIG. 17

| vps_extension( ) { | Descriptor |
|---|---|
|   while( !byte_aligned( ) ) | |
|     vps_extension_byte_alignment_reserved_zero_bit | u(1) |
|   // layer specific information | |
|   for( i = 1; i <= max_num_layers_minus1; i++ ) { | |
|     // mask signalling scalability types that are present for this layer ID | |
|     scalability_mask | u(8) |
|     for( j = 0; j <= num_scalability_types[i]; j++ ) { | |
|       scalability_id[ j ] | u(8) |
|     } | |
|     // layer dependency | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video parameter set extension syntax

FIG. 18

| scalability_mask_bit[k] | Scalability dimension |
|---|---|
| 0 | spatial |
| 1 | quality |
| 2 | depth |
| 3 | multiview |
| 4-15 | Reserved |

Scalability Map Syntax

FIG 19

| | |
|---|---|
| video_parameter_set_rbsp() { | Descriptor |
|   video_parameter_set_id | u(4) |
|   vps_temporal_id_nesting_flag | u(1) |
|   reserved_zero_2bits | u(2) |
|   max_num_layers_minus1 //reserved_zero_6bits | u(6) |
|   vps_max_sub_layers_minus1 | u(3) |
|   profile_level( 1, vps_max_sub_layers_minus1 ) | |
|   next_essential_info_byte_offset //reserved_zero_12bits | u(12) |
|   for( i = 0; i <= vps_max_sub_layers_minus1; i++ ) { | |
|     vps_max_dec_pic_buffering[ i ] | ue(v) |
|     vps_max_num_reorder_pics[ i ] | ue(v) |
|     vps_max_latency_increase[ i ] | ue(v) |
|   } | |
|   num_hrd_parameters | ue(v) |
|   for( i = 0; i < num_hrd_parameters; i++ ) { | |
|     if( i > 0 ) | |
|       op_point( i ) | |
|     hrd_parameters( i == 0, vps_max_sub_layers_minus1 ) | |
|   } | |
|   bit_equal_to_one | u(1) |
|   scalability_mask | u(8) |
|   for( i = 0; i <= max_num_layers_minus1; i++ ) { | |
|     vps_extension_data() | |
|   } | |
|   vps_extension_flag | u(1) |
|   if( vps_extension_flag ) | |
|     while( more_rbsp_data() ) | |
|       vps_extension_data_flag | u(1) |
|   rbsp_trailing_bits() | |
| } | |
| } | |

Video parameter set extension syntax

FIG. 20

| vps_extension_data() { | Descriptor |
|---|---|
| vps_extension_type | u(2) |
| layer_id | u(6) |
| layer_max_sub_layers_minus1 | u(3) |
| new_profile_level_flag | u(1) |
| if ( new_profile_level_flag == 0 ) { | |
| profile_reference_layer_id | u(6) |
| } | |
| else { | |
| profile_level( 1, layer_max_sub_layers_minus1 ) | |
| } | |
| for( j = 0; j <= num_scalability_types; j++ ) { | |
| scalable_id[ j ] | u(8) |
| } | |
| num_reference_layers | u(6) |
| for( n = 0; n < num_reference_layers; n ++ ) | |
| direct_coding_dependency_layer_id_plus1[ n ] | u(6) |
| } | |

Video parameter set extension syntax

FIG. 21

| vps_extension() { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++ ) { | |
|     dimension_id_len_minus1[ i ] | u(3) |
|   } | |
|   vps_nuh_layer_id_present_flag | u(1) |
|   // layer specific information | |
|   for( i = 1; i <= vps_max_layers_minus1; i++ ) { | |
|     // mapping of layer ID to scalability dimension IDs | |
|     if( vps_nuh_layer_id_present_flag ) | |
|       layer_id_in_nuh[ i ] | u(6) |
|     for( j = 0; j <NumScalabilityTypes; j++ ) | |
|       dimension_id[ i ][ j ] | u(v8) |
|   } | |
|   for( i = 1; i <= vps_max_layers_minus1 ; i++ ) | |
|     profile_tier_level( 1, vps_max_sub_layers_minus1 ) | |
|   for( i = 1; i <= vps_max_layers_minus1; i++ ) { | |
|     // layer dependency | |
|     num_direct_ref_layers[ i ] | u(6) |
|     for( j = 0; j <num_direct_ref_layers[ i ]; j++ ) | |
|       ref_layer_id[ i ][ j ] | u(6) |
|   } | |
| } | |

Video Parameter Set Extension Syntax

FIG. 22

| scalability_mask's k'th bit | Scalability dimension |
|---|---|
| 0 | spatial |
| 1 | quality |
| 2 | depth |
| 3 | multiview |
| 4-15 | Reserved |

Scalability_mask Syntax

FIG 23

| vps_extension( ) { | Descriptor |
|---|---|
| while( !byte_aligned( ) ) | |
| vps_extension_byte_alignment_reserved_one_bit | u(1) |
| avc_base_codec_flag | u(1) |
| scalability_mask | u(16) |
| vps_implicit_dimension_ids_flag | u(1) |
| for( i = 0; i <NumScalabilityTypes; i++ ) { | |
| dimension_id_len_minus1[ i ] | u(3) |
| if(vps_implicit_dimension_ids_flag) | |
| max_dimension_id_minus1[ i ] | u(3) |
| } | |
| if(!vps_implicit_dimension_ids_flag) { | |
| vps_nuh_layer_id_present_flag | u(1) |
| // layer specific information | |
| for( i = 1; i <= vps_max_layers_minus1; i++ ) { | |
| // mapping of layer ID to scalability dimension IDs | |
| if( vps_nuh_layer_id_present_flag ) | |
| layer_id_in_nuh[ i ] | u(6) |
| for( j = 0; j <= num_dimensions_minus1; j++ ) | |
| dimension_id[ i ][ j ] | u(v) |
| } | |
| } | |
| for( i = 1; i <= vps_max_layers_minus1 ; i++ ) | |
| profile_tier_level( 1, vps_max_sub_layers_minus1 ) | |
| for( i = 1; i <= vps_max_layers_minus1; i++ ) { | |
| // layer dependency information signaling | |
| num_direct_ref_layers[ i ] | u(6) |
| for( j = 0; j < num_direct_ref_layers[ i ]; j++ ) | |
| ref_layer_id[ i ][ j ] | u(6) |
| } | |
| } | |

Video Parameter Set Extension Syntax

FIG. 24

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   vps_implicit_dimension_ids_flag | u(1) |
|   for( i = 0; i <NumScalabilityTypes; i++ ) { | |
|     dimension_id_len_minus1[ i ] | u(3) |
|     if(vps_implicit_dimension_ids_flag) | |
|       max_dimension_id_minus1[ i ] | u(3) |
|   } | |
|   vps_nuh_layer_id_present_flag | u(1) |
|   // layer specific information | |
|   for( i = 1; i <= vps_max_layers_minus1; i++ ) { | |
|     // mapping of layer ID to scalability dimension IDs | |
|     if( vps_nuh_layer_id_present_flag ) | |
|       layer_id_in_nuh[ i ] | u(6) |
|     if(!vps_implicit_dimension_ids_flag) { | |
|       for( j = 0; j <= num_dimensions_minus1; j++ ) | |
|         dimension_id[ i ][ j ] | u(v) |
|     } | |
|   } | |
|   for( i = 1; i <= vps_max_layers_minus1 ; i++ ) | |
|     profile_tier_level( 1, vps_max_sub_layers_minus1 ) | |
|   for( i = 1; i <= vps_max_layers_minus1; i++ ) { | |
|     // layer dependency information signaling | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video Parameter Set Extension Syntax

FIG. 25

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++ ) { | |
|     dimension_id_len_minus1[ i ] | u(3) |
|   } | |
|   vps_implicit_dimension_ids_flag | u(1) |
|   if(vps_implicit_dimension_ids_flag) { | |
|     for( i = 0; i <NumScalabilityTypes; i++ ) | |
|       max_dimension_id_minus1[ i ] | u(3) |
|   } | |
|   else{ | |
|     vps_nuh_layer_id_present_flag | u(1) |
|     // layer specific information | |
|     for( i = 1; i <= vps_max_layers_minus1; i++ ) { | |
|       // mapping of layer ID to scalability dimension IDs | |
|       if( vps_nuh_layer_id_present_flag ) | |
|         layer_id_in_nuh[ i ] | u(6) |
|       for( j = 0; j <= num_dimensions_minus1; j++ ) | |
|         dimension_id[ i ][ j ] | u(v) |
|     } | |
|   } | |
|   for( i = 1; i <= vps_max_layers_minus1 ; i++ ) | |
|     profile_tier_level( 1, vps_max_sub_layers_minus1 ) | |
|   for( i = 1; i <= vps_max_layers_minus1; i++ ) { | |
|     // layer dependency information signaling | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video Parameter Set Extension Syntax

FIG. 26

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++ ) { | |
|     dimension_id_len_minus1[ i ] | u(3) |
|   } | |
|   vps_implicit_dimension_ids_flag | u(1) |
|   if(vps_implicit_dimension_ids_flag) { | |
|     for( i = 0; i <NumScalabilityTypes; i++ ) | |
|       max_dimension_id_minus1[ i ] | u(3) |
|   } | |
|   vps_nuh_layer_id_present_flag | u(1) |
|   // layer specific information | |
|   for( i = 1; i <= vps_max_layers_minus1; i++ ) { | |
|     // mapping of layer ID to scalability dimension IDs | |
|     if( vps_nuh_layer_id_present_flag ) | |
|       layer_id_in_nuh[ i ] | u(6) |
|   if(!vps_implicit_dimension_ids_flag) { | |
|     for( j = 0; j <= num_dimensions_minus1; j++ ) | |
|       dimension_id[ i ][ j ] | u(v) |
|     } | |
|   } | |
|   for( i = 1; i <= vps_max_layers_minus1 ; i++ ) | |
|     profile_tier_level( 1, vps_max_sub_layers_minus1 ) | |
|   for( i = 1; i <= vps_max_layers_minus1; i++ ) { | |
|     // layer dependency information signaling | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video Parameter Set Extension Syntax

FIG. 27

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   vps_implicit_dimension_ids_flag | u(1) |
|   for( i = 0; i <NumScalabilityTypes; i++ ) { | |
|     dimension_id_len_minus1[ i ] | u(3) |
|     if(vps_implicit_dimension_ids_flag) { | |
|       max_dimension_id_minus1[ i ] | u(3) |
|       dimension_index_order[i] | u(4) |
|     } | |
|   } | |
|   if(!vps_implicit_dimension_ids_flag){ | |
|     vps_nuh_layer_id_present_flag | u(1) |
|     // layer specific information | |
|     for( i = 1; i <= vps_max_layers_minus1; i++ ) { | |
|       // mapping of layer ID to scalability dimension IDs | |
|       if( vps_nuh_layer_id_present_flag ) | |
|         layer_id_in_nuh[ i ] | u(6) |
|       for( j = 0; j <= num_dimensions_minus1; j++ ) | |
|         dimension_id[ i ][ j ] | u(v) |
|     } | |
|   } | |
|   for( i = 1; i <= vps_max_layers_minus1 ; i++ ) | |
|     profile_tier_level( 1, vps_max_sub_layers_minus1 ) | |
|   for( i = 1; i <= vps_max_layers_minus1; i++ ) { | |
|     // layer dependency information signaling | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video Parameter Set Extension Syntax

FIG. 28

| | Descriptor |
|---|---|
| vps_extension( ) { | |
|   while( !byte_aligned( ) ) | |
|     vps_extension_byte_alignment_reserved_one_bit | u(1) |
|   avc_base_codec_flag | u(1) |
|   scalability_mask | u(16) |
|   vps_implicit_dimension_ids_flag | u(1) |
|   for( i = 0; i <NumScalabilityTypes; i++ ) { | |
|     dimension_id_len_minus1[ i ] | u(3) |
|     if(vps_implicit_dimension_ids_flag) { | |
|       max_dimension_id_minus1[ i ] | u(3) |
|       dimension_index_order[i] | u(4) |
|     } | |
|   } | |
|   vps_nuh_layer_id_present_flag | u(1) |
|   // layer specific information | |
|   for( i = 1; i <= vps_max_layers_minus1; i++ ) { | |
|     // mapping of layer ID to scalability dimension IDs | |
|     if( vps_nuh_layer_id_present_flag ) | |
|       layer_id_in_nuh[ i ] | u(6) |
|     if(!vps_implicit_dimension_ids_flag) { | |
|       for( j = 0; j <= num_dimensions_minus1; j++ ) | |
|         dimension_id[ i ][ j ] | u(v) |
|     } | |
|   } | |
|   for( i = 1; i <= vps_max_layers_minus1 ; i++ ) | |
|     profile_tier_level( 1, vps_max_sub_layers_minus1 ) | |
|   for( i = 1; i <= vps_max_layers_minus1; i++ ) { | |
|     // layer dependency information signaling | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video Parameter Set Extension Syntax

FIG. 29

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++ ) { | |
|     dimension_id_len_minus1[ i ] | u(3) |
|   } | |
|   vps_implicit_dimension_ids_flag | u(1) |
|   if(vps_implicit_dimension_ids_flag) { | |
|     for( i = 0; i <NumScalabilityTypes; i++ ) | |
|       max_dimension_id_minus1[ i ] | u(3) |
|       dimension_index_order[i] | u(4) |
|   } | |
|   else{ | |
|     vps_nuh_layer_id_present_flag | u(1) |
|     // layer specific information | |
|     for( i = 1; i <= vps_max_layers_minus1; i++ ) { | |
|       // mapping of layer ID to scalability dimension IDs | |
|       if( vps_nuh_layer_id_present_flag ) | |
|         layer_id_in_nuh[ i ] | u(6) |
|       for( j = 0; j <= num_dimensions_minus1; j++ ) | |
|         dimension_id[ i ][ j ] | u(v) |
|     } | |
|   } | |
|   for( i = 1; i <= vps_max_layers_minus1 ; i++ ) | |
|     profile_tier_level( 1, vps_max_sub_layers_minus1 ) | |
|   for( i = 1; i <= vps_max_layers_minus1; i++ ) { | |
|     // layer dependency information signaling | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video Parameter Set Extension Syntax

FIG. 30

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++ ) { | |
|     dimension_id_len_minus1[ i ] | u(3) |
|   } | |
|   vps_implicit_dimension_ids_flag | u(1) |
|   if(vps_implicit_dimension_ids_flag) { | |
|     for( i = 0; i <NumScalabilityTypes; i++ ) | |
|       max_dimension_id_minus1[ i ] | u(3) |
|       dimension_index_order[i] | u(4) |
|   } | |
|   vps_nuh_layer_id_present_flag | u(1) |
|   // layer specific information | |
|   for( i = 1; i <= vps_max_layers_minus1; i++ ) { | |
|     // mapping of layer ID to scalability dimension IDs | |
|     if( vps_nuh_layer_id_present_flag ) | |
|       layer_id_in_nuh[ i ] | u(6) |
|     if(!vps_implicit_dimension_ids_flag) { | |
|       for( j = 0; j <= num_dimensions_minus1; j++ ) | |
|         dimension_id[ i ][ j ] | u(v) |
|     } | |
|   } | |
|   for( i = 1; i <= vps_max_layers_minus1 ; i++ ) | |
|     profile_tier_level( 1, vps_max_sub_layers_minus1 ) | |
|   for( i = 1; i <= vps_max_layers_minus1; i++ ) { | |
|     // layer dependency information signaling | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

Video Parameter Set Extension Syntax

FIG. 31

IMPLICIT SIGNALING OF SCALABILITY DIMENSION IDENTIFIER INFORMATION IN A PARAMETER SET

CROSS-REFERENCE TO RELATED APPLICATIONS

This application is a continuation of U.S. application Ser. No. 15/040,600, filed Feb. 10, 2016, which is a continuation of U.S. application Ser. No. 14/145,627, filed Dec. 31, 2013, which claims the benefit of U.S. Provisional App. No. 61/749,173, filed Jan. 4, 2013. Contents of the above applications are incorporated herein by reference in their entirety.

BACKGROUND OF THE INVENTION

The present invention relates to video encoding and decoding.

Electronic devices have become smaller and more powerful in order to meet consumer needs and to improve portability and convenience. Consumers have become dependent upon electronic devices and have come to expect increased functionality Some examples of electronic devices include desktop computers, laptop computers, cellular phones, smart phones, media players, integrated circuits, etc.

Some electronic devices are used for processing and/or displaying digital media. For example, portable electronic devices now allow for digital media to be produced and/or consumed at almost any location where a consumer may be. Furthermore, some electronic devices may provide download or streaming of digital media content for the use and enjoyment of a consumer.

Digital video is typically represented as a series of images or frames, each of which contains an array of pixels. Each pixel includes information, such as intensity and/or color information. In many cases, each pixel is represented as a set of three colors. Some video coding techniques provide higher coding efficiency at the expense of increasing complexity. Increasing image quality requirements and increasing image resolution requirements for video coding techniques also increase the coding complexity.

The increasing popularity of digital media has presented several problems. For example, efficiently representing high-quality digital media for storage, transmittal, and playback presents several challenges. Techniques that represent digital media more efficiently is beneficial.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 7 illustrates a frame with a slice and 9 tiles.

FIG. 8 illustrates a frame with three slices and 3 tiles.

FIGS. 9A-9C illustrates different NAL Unit header syntax.

FIG. 10 illustrates a general NAL Unit syntax.

FIG. 11 illustrates an existing video parameter set.

FIG. 12 illustrates existing scalability types.

FIG. 13 illustrates an exemplary video parameter set.

FIG. 14 illustrates an exemplary scalability map syntax.

FIG. 15 illustrates an exemplary video parameter set.

FIG. 16 illustrates an existing video parameter set.

FIG. 17 illustrates an existing dimension type, dimension id syntax.

FIG. 18 illustrates an exemplary video parameter set.

FIG. 19 illustrates an exemplary scalability map syntax.

FIG. 20 illustrates an exemplary video parameter set.

FIG. 21 illustrates an exemplary video parameter set.

FIG. 22 illustrates an exemplary video parameter set.

FIG. 23 illustrates an exemplary scalability mask syntax.

FIG. 24 illustrates an exemplary video parameter set extension syntax.

FIG. 25 illustrates an exemplary video parameter set extension syntax.

FIG. 26 illustrates an exemplary video parameter set extension syntax.

FIG. 27 illustrates an exemplary video parameter set extension syntax.

FIG. 28 illustrates an exemplary video parameter set extension syntax.

FIG. 29 illustrates an exemplary video parameter set extension syntax.

FIG. 30 illustrates an exemplary video parameter set extension syntax.

FIG. 31 illustrates an exemplary video parameter set extension syntax.

DETAILED DESCRIPTION OF PREFERRED EMBODIMENT

Figure 1:
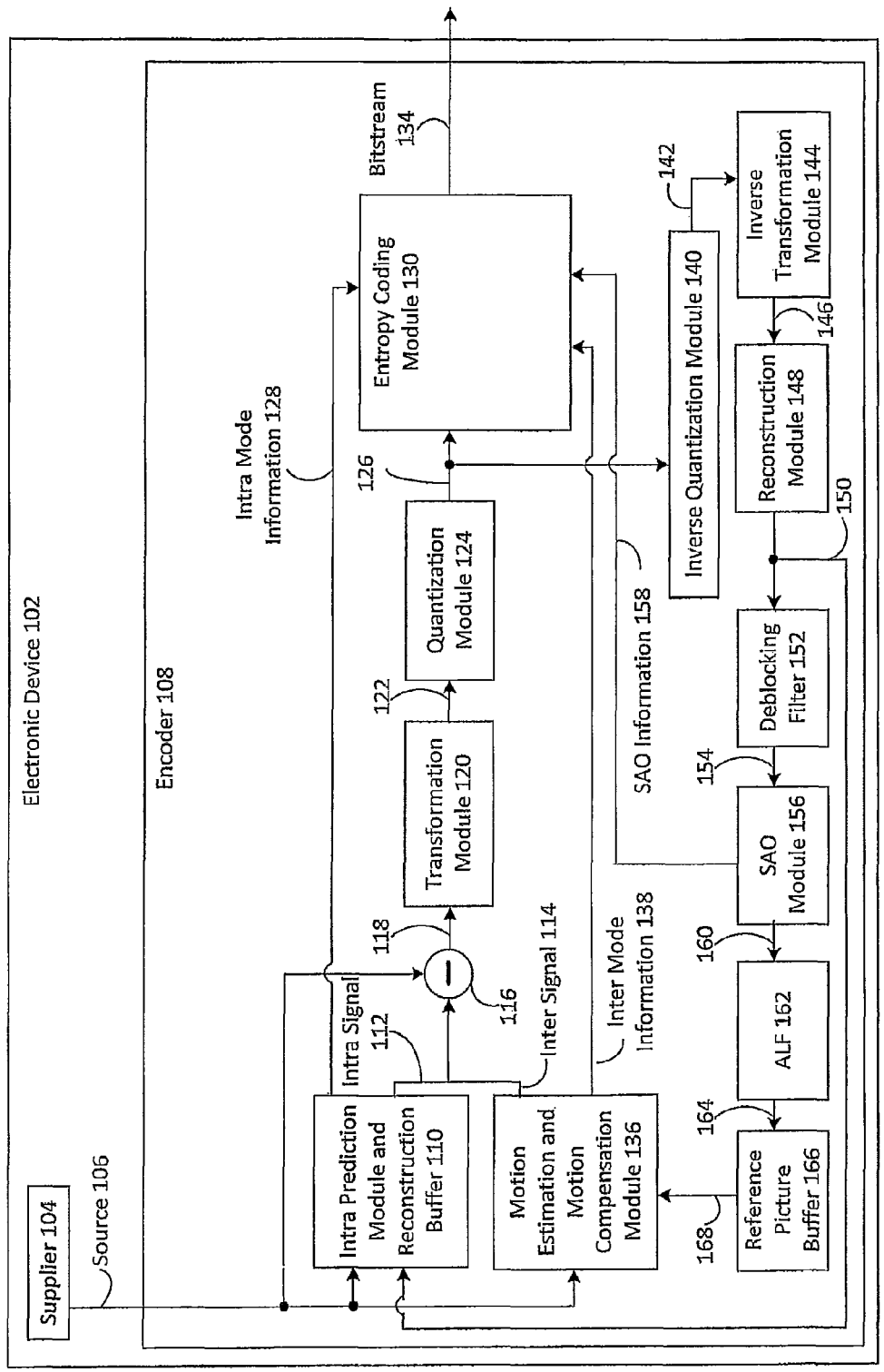
FIG. 1 is a block diagram illustrating one configuration of an electronic device including a HEVC encoder.

The Joint Collaborative Team on Video Coding (JCT-VC) of the International Telecommunication Union Telecommunication Standardization Sector (ITU-T) Study Group 16 (SG16) Working Party 3 (WP3) and International Organization for Standardization/International Electrotechnical Commission (ISO/IEC) Joint Technical Committee 1/Subcommittee 29/Working Group 11 (JTC1/SC29/WG11) has launched a standardization effort for a video coding standard called the High Efficiency Video Coding standard (HEVC). HEVC uses block-based coding.

In HEVC, an entropy coding technique Context-Adaptive Binary Arithmetic Coding CABAC)) is used to compress Transformed and Quantized Coefficients (TQCs) without loss. TQCs may be from different block sizes according to transform sizes (e.g., 4×4, 8×8, 16×16, 32×32).

Two-dimensional (2D) TQCs may be converted into a one-dimensional (1D) array before entropy coding. In one example, 2D arrayed TQCs in a 4×4 block may be arranged as illustrated in Table (1).

TABLE (1)

| 4  | 0 | 1   | 0   |
|----|---|-----|-----|
| 3  | 2 | −1  | ... |
| −3 | 0 | ... | ... |
| 0  | ...| ... | ... |

When converting the 2D TQCs into a 1D array, the block may be scanned in a diagonal zig-zag fashion. Continuing with the example, the 2D arrayed TQCs illustrated in Table (1) may be converted into 1D arrayed TQCs [4, 0, 3, −3, 2, 1, 0, −1, 0, . . . ] by scanning the first row and first column, first row and second column, second row and first column, third row and first column, second row and second column, first row and third column, first row and fourth column, second row and third column, third row and second column, fourth row and first column and so on.

The coding procedure in HEVC may proceed, for example, as follows. The TQCs in the 1D array may be ordered according to scanning position. The scanning position of the last significant coefficient and the last coefficient level may be determined. The last significant coefficient may be coded. It should be noted that coefficients are typically coded in reverse scanning order. Run-level coding may be performed, which encodes information about runs of identical numbers and/or bits rather than encoding the numbers themselves, which is activated directly after the last coefficient coding. Then, level coding may be performed. The term significant coefficient refers to a coefficient that has a coefficient level value that is greater than zero. A coefficient level value refers to a unique indicator of the magnitude (or absolute value) of a Transformed and Quantized Coefficient (TQC) value.

This procedure may be illustrated in Table (2) as a continuation of the example above (with the 1D arrayed TQCs [4, 0, 3, −3, 2, 1, 0, −1, 0, . . . ]).

TABLE (2)

| | Scanning Position | | | | | | | | |
|---|---|---|---|---|---|---|---|---|---|
| | 0 | 1 | 2 | 3 | 4 | 5 | 6 | 7 | ... |
| | Coefficient Level | | | | | | | | |
| | 4 | 0 | 3 | −3 | 2 | 1 | 0 | −1 | ... |
| Last Position | | | | | | | | 7 | |
| Last Coefficient Level | | | | | | | | −1 | |
| Run-Level Coding | | | | | | 2 | 1 | 0 | |
| Level Coding | 4 | 0 | 3 | −3 | | | | | |

In Table (2), for example, the coefficient level −1 at scanning position 7 may be the last non-zero coefficient. Thus, the last position is scanning position 7 and the last coefficient level is −1. Run-level coding may be performed for coefficients 0, 1 and 2 at scanning positions 6, 5 and 4 (where coefficients are coded in reverse scanning order). Then, level coding may be performed for the coefficient levels −3, 3, 0 and 4.

FIG. 1 is a block diagram illustrating one configuration of an electronic device 102 in which video may be coded. It should be noted that one or more of the elements illustrated as included within the electronic device 102 may be implemented in hardware, software, or a combination of both. For example, the electronic device 102 includes a encoder 108, which may be implemented in hardware, software or a combination of both. For instance, the encoder 108 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 108 may be a high efficiency video coding (HEVC) coder.

The electronic device 102 may include a supplier 104. The supplier 104 may provide picture or image data (e.g., video) as a source 106 to the encoder 108. Examples of the supplier 104 include image sensors, memory, communication interfaces, network interfaces, wireless receivers, ports, etc.

The source 106 may be provided to an intra-frame prediction module and reconstruction buffer 110. The source 106 may also be provided to a motion estimation and motion compensation module 136 and to a subtraction module 116.

The intra-frame prediction module and reconstruction buffer 110 may generate intra mode information 128 and an intra signal 112 based on the source 106 and reconstructed data 150. The motion estimation and motion compensation module 136 may generate inter mode information 138 and an inter signal 114 based on the source 106 and a reference picture buffer 166 signal 168. The reference picture buffer 166 signal 168 may include data from one or more reference pictures stored in the reference picture buffer 166.

The encoder 108 may select between the intra signal 112 and the inter signal 114 in accordance with a mode. The intra signal 112 may be used in order to exploit spatial characteristics within a picture in an intra coding mode. The inter signal 114 may be used in order to exploit temporal characteristics between pictures in an inter coding mode. While in the intra coding mode, the intra signal 112 may be provided to the subtraction module 116 and the intra mode information 128 may be provided to an entropy coding module 130. While in the inter coding mode, the inter signal 114 may be provided to the subtraction module 116 and the inter mode information 138 may be provided to the entropy coding module 130.

Either the intra signal 112 or the inter signal 114 (depending on the mode) is subtracted from the source 106 at the subtraction module 116 in order to produce a prediction residual 118. The prediction residual 118 is provided to a transformation module 120. The transformation module 120 may compress the prediction residual 118 to produce a transformed signal 122 that is provided to a quantization module 124. The quantization module 124 quantizes the transformed signal 122 to produce transformed and quantized coefficients (TQCs) 126.

The TQCs 126 are provided to an entropy coding module 130 and an inverse quantization module 140. The inverse quantization module 140 performs inverse quantization on the TQCs 126 to produce an inverse quantized signal 142 that is provided to an inverse transformation module 144. The inverse transformation module 144 decompresses the inverse quantized signal 142 to produce a decompressed signal 146 that is provided to a reconstruction module 148.

The reconstruction module 148 may produce reconstructed data 150 based on the decompressed signal 146. For example, the reconstruction module 148 may reconstruct (modified) pictures. The reconstructed data 150 may be provided to a deblocking filter 152 and to the intra prediction module and reconstruction buffer 110. The deblocking filter 152 may produce a filtered signal 154 based on the reconstructed data 150.

The filtered signal 154 may be provided to a sample adaptive offset (SAO) module 156. The SAO module 156 may produce SAO information 158 that is provided to the entropy coding module 130 and an SAO signal 160 that is provided to an adaptive loop filter (ALF) 162. The ALF 162 produces an ALF signal 164 that is provided to the reference picture buffer 166. The ALF signal 164 may include data from one or more pictures that may be used as reference pictures. In some cases the ALF 162 may be omitted.

The entropy coding module 130 may code the TQCs 126 to produce a bitstream 134. As described above, the TQCs 126 may be converted to a 1D array before entropy coding. Also, the entropy coding module 130 may code the TQCs 126 using CAVLC or CABAC. In particular, the entropy coding module 130 may code the TQCs 126 based on one or more of intra mode information 128, inter mode information 138 and SAO information 158. The bitstream 134 may include coded picture data.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 102 (e.g., the encoder 108) may determine the QP, resolution information and block type, which may be provided to the entropy coding module 130.

The entropy coding module 130 may determine the block size based on a block of TQCs 126. For example, block size may be the number of TQCs 126 along one dimension of the block of TQCs. In other words, the number of TQCs 126 in the block of TQCs may be equal to block size squared. In addition, the block may be non-square where the number of TQCs 126 is the height times the width of the block. For instance, block size may be determined as the square root of the number of TQCs 126 in the block of TQCs. Resolution may be defined as a pixel width by a pixel height. Resolution information may include a number of pixels for the width of a picture, for the height of a picture or both. Block size may be defined as the number of TQCs along one dimension of a 2D block of TQCs.

In some configurations, the bitstream 134 may be transmitted to another electronic device. For example, the bitstream 134 may be provided to a communication interface, network interface, wireless transmitter, port, etc. For instance, the bitstream 134 may be transmitted to another electronic device via a Local Area Network (LAN), the Internet, a cellular phone base station, etc. The bitstream 134 may additionally or alternatively be stored in memory on the electronic device 102.

Figure 2:
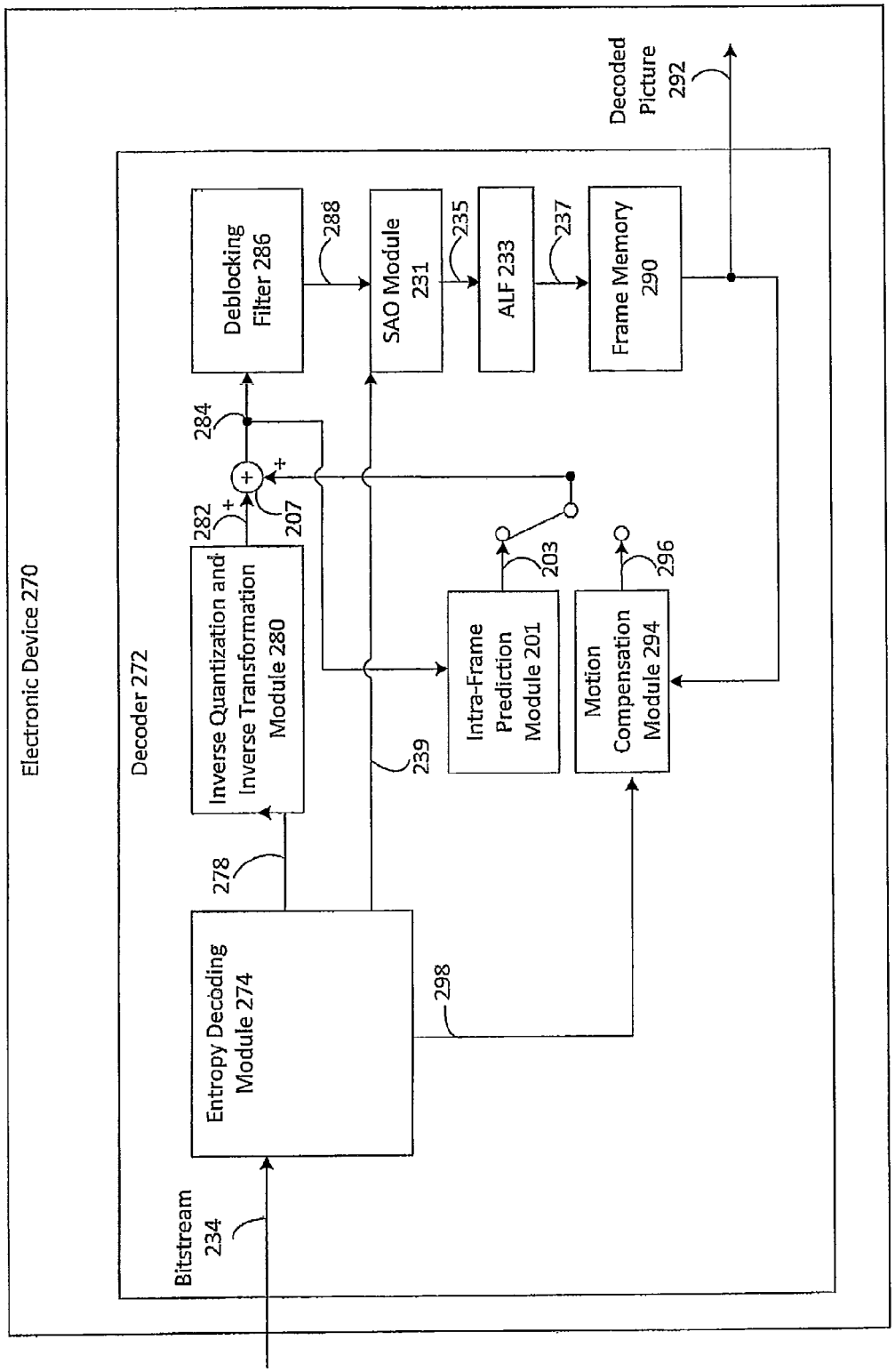
FIG. 2 is a block diagram illustrating one configuration of an electronic device including a HEVC decoder.

FIG. 2 is a block diagram illustrating one configuration of an electronic device 270 including a decoder 272 that may be a high-efficiency video coding (HEVC) decoder. The decoder 272 and one or more of the elements illustrated as included in the decoder 272 may be implemented in hardware, software or a combination of both. The decoder 272 may receive a bitstream 234 (e.g., one or more coded pictures included in the bitstream 234) for decoding. In some configurations, the received bitstream 234 may include received overhead information, such as a received slice header, received picture parameter set (PPS), received buffer description information, classification indicator, etc.

Received symbols (e.g., encoded TQCs) from the bitstream 234 may be entropy decoded by an entropy decoding module 274. This may produce a motion information signal 298 and decoded transformed and quantized coefficients (TQCs) 278.

The motion information signal 298 may be combined with a portion of a decoded picture 292 from a frame memory 290 at a motion compensation module 294, which may produce an inter-frame prediction signal 296. The decoded transformed and quantized coefficients (TQCs) 278 may be inverse quantized and inverse transformed by an inverse quantization and inverse transformation module 280, thereby producing a decoded residual signal 282. The decoded residual signal 282 may be added to a prediction signal 205 by a summation module 207 to produce a combined signal 284. The prediction signal 205 may be a signal selected from either the inter-frame prediction signal 296 produced by the motion compensation module 294 or an intra-frame prediction signal 203 produced by an intra-frame prediction module 201. In some configurations, this signal selection may be based on (e.g., controlled by) the bitstream 234.

The intra-frame prediction signal 203 may be predicted from previously decoded information from the combined signal 284 (in the current frame, for example). The combined signal 284 may also be filtered by a deblocking filter 286. The resulting filtered signal 288 may be provided to a sample adaptive offset (SAO) module 231. Based on the filtered signal 288 and information 239 from the entropy decoding module 274, the SAO module 231 may produce an SAO signal 235 that is provided to an adaptive loop filter (ALF) 233. The ALF 233 produces an ALF signal 237 that is provided to the frame memory 290. The ALF signal 237 may include data from one or more pictures that may be used as reference pictures. The ALF signal 237 may be written to frame memory 290. The resulting ALF signal 237 may include a decoded picture. In some cases the ALF 233 may be omitted.

The frame memory 290 may include a decoded picture buffer (DPB). The frame memory 290 may also include overhead information corresponding to the decoded pictures. For example, the frame memory 290 may include slice headers, picture parameter set (PPS) information, cycle parameters, buffer description information, etc. One or more of these pieces of information may be signaled from a coder (e.g., encoder 108).

The frame memory 290 may provide one or more decoded pictures 292 to the motion compensation module 294. Furthermore, the frame memory 290 may provide one or more decoded pictures 292, which may be output from the decoder 272. The one or more decoded pictures 292 may be presented on a display, stored in memory or transmitted to another device, for example.

Figure 3:
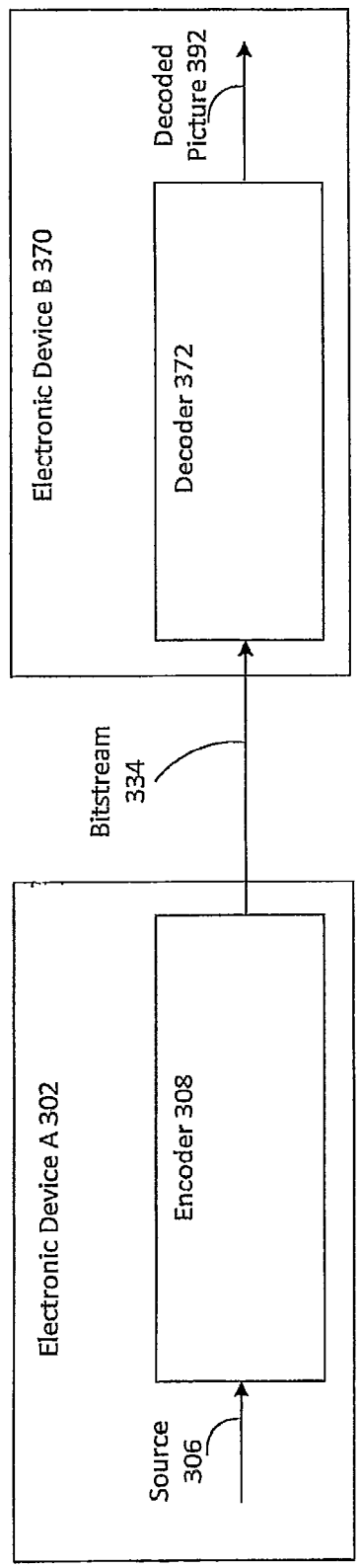
FIG. 3 is a block diagram illustrating one example of an encoder and a decoder.

FIG. 3 is a block diagram illustrating one example of an ecoder 308 and a decoder 372. In this example, electronic device A 302 and electronic device B 370 are illustrated. However, it should be noted that the features and functionality described in relation to electronic device A 302 and electronic device B 370 may be combined into a single electronic device in some configurations.

Electronic device A 302 includes the encoder 308. The encoder 308 may be implemented in hardware, software or a combination of both. In one configuration, the encoder 308 may be a high-efficiency video coding (HEVC) coder. Other coders may likewise be used. Electronic device A 302 may obtain a source 306. In some configurations, the source 306 may be captured on electronic device A 302 using an image sensor, retrieved from memory or received from another electronic device.

The encoder 308 may code the source 306 to produce a bitstream 334. For example, the encoder 308 may code a series of pictures (e.g., video) in the source 306. The encoder 308 may be similar to the encoder 108 described above in connection with FIG. 1.

The bitstream 334 may include coded picture data based on the source 306. In some configurations, the bitstream 334 may also include overhead data, such as slice header information, PPS information, etc. As additional pictures in the source 306 are coded, the bitstream 334 may include one or more coded pictures.

The bitstream 334 may be provided to the decoder 372. In one example, the bitstream 334 may be transmitted to electronic device B 370 using a wired or wireless link. In some cases, this may be done over a network, such as the Internet or a Local Area Network (LAN). As illustrated in FIG. 3, the decoder 372 may be implemented on electronic device B 370 separately from the encoder 308 on electronic device A 302. However, it should be noted that the encoder 308 and decoder 372 may be implemented on the same electronic device in some configurations. In an implementation where the encoder 308 and decoder 372 are implemented on the same electronic device, for instance, the bitstream 334 may be provided over a bus to the decoder 372 or stored in memory for retrieval by the decoder 372.

The decoder 372 may be implemented in hardware, software or a combination of both. In one configuration, the decoder 372 may be a high-efficiency video coding (HEVC) decoder. Other decoders may likewise be used. The decoder 372 may be similar to the decoder 272 described above in connection with FIG. 2.

Figure 4:
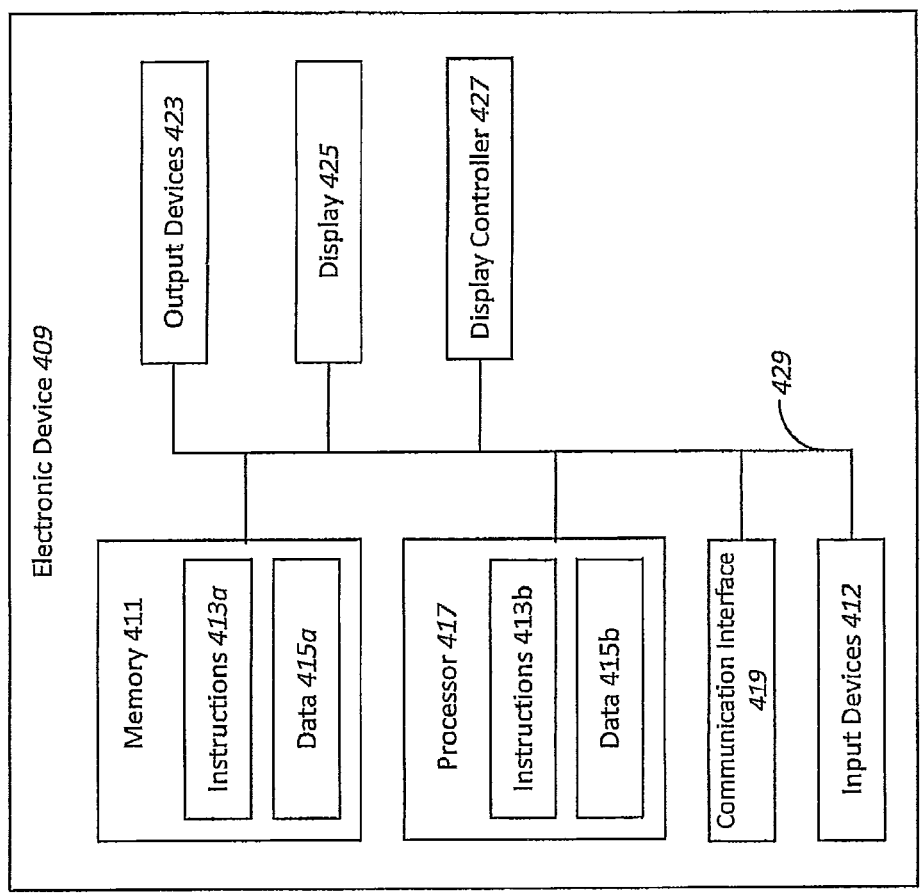
FIG. 4 illustrates various components that may be utilized in an electronic device.

FIG. 4 illustrates various components that may be utilized in an electronic device 409. The electronic device 409 may be implemented as one or more of the electronic devices. For example, the electronic device 409 may be implemented as the electronic device 102 described above in connection with FIG. 1, as the electronic device 270 described above in connection with FIG. 2, or both.

The electronic device 409 includes a processor 417 that controls operation of the electronic device 409. The processor 417 may also be referred to as a CPU. Memory 411, which may include both read-only memory (ROM), random access memory (RAM) or any type of device that may store information, provides instructions 413a (e.g., executable instructions) and data 415a to the processor 417. A portion of the memory 411 may also include non-volatile random access memory (NVRAM). The memory 411 may be in electronic communication with the processor 417.

Instructions 413b and data 415b may also reside in the processor 417. Instructions 413b and/or data 415b loaded into the processor 417 may also include instructions 413a and/or data 415a from memory 411 that were loaded for execution or processing by the processor 417. The instructions 413b may be executed by the processor 417 to implement one or more techniques disclosed herein.

The electronic device 409 may include one or more communication interfaces 419 for communicating with other electronic devices. The communication interfaces 419 may be based on wired communication technology, wireless communication technology, or both. Examples of communication interfaces 419 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 409 may include one or more output devices 423 and one or more input devices 421. Examples of output devices 423 include a speaker, printer, etc. One type of output device that may be included in an electronic device 409 is a display device 425. Display devices 425 used with configurations disclosed herein may utilize any suitable image projection technology, such as a cathode ray tube (CRT), liquid crystal display (LCD), light-emitting diode (LED), gas plasma, electroluminescence or the like. A display controller 427 may be provided for converting data stored in the memory 411 into text, graphics, and/or moving images (as appropriate) shown on the display 425. Examples of input devices 421 include a keyboard, mouse, micro-phone, remote control device, button, joystick, trackball, touchpad, touchscreen, lightpen, etc.

The various components of the electronic device 409 are coupled together by a bus system 429, which may include a power bus, a control signal bus and a status signal bus, in addition to a data bus. However, for the sake of clarity, the various buses are illustrated in FIG. 4 as the bus system 429. The electronic device 409 illustrated in FIG. 4 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. The code for the decoder and/or encoder may be stored on a computer readable medium.

An input picture comprising a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 5:
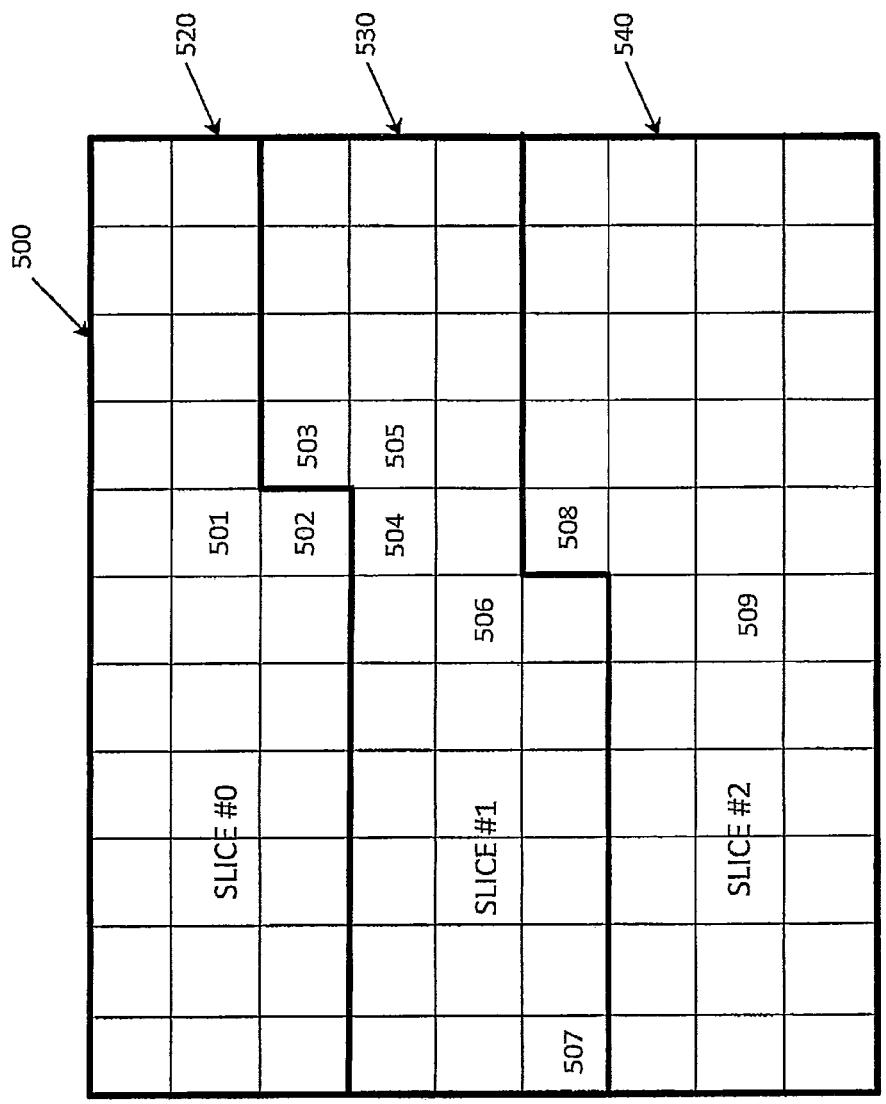
FIG. 5 illustrates an exemplary slice structure.

FIG. 5 illustrates an exemplary video picture 500 comprising eleven blocks in the horizontal direction and nine blocks in the vertical direction (nine exemplary blocks labeled 501-509). FIG. 5 illustrates three exemplary slices: a first slice denoted "SLICE #0" 520, a second slice denoted "SLICE #1" 530 and a third slice denoted "SLICE #2" 540. The decoder may decode and reconstruct the three slices 520, 530, 540, in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 503, in "SLICE #1", blocks (for example, blocks labeled 501 and 502) in "SLICE #0" may not be used for context model selection or reconstruction. Whereas, for a block, for example, the block labeled 505, in "SLICE #1," other blocks (for example, blocks labeled 503 and 504) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Figure 6:
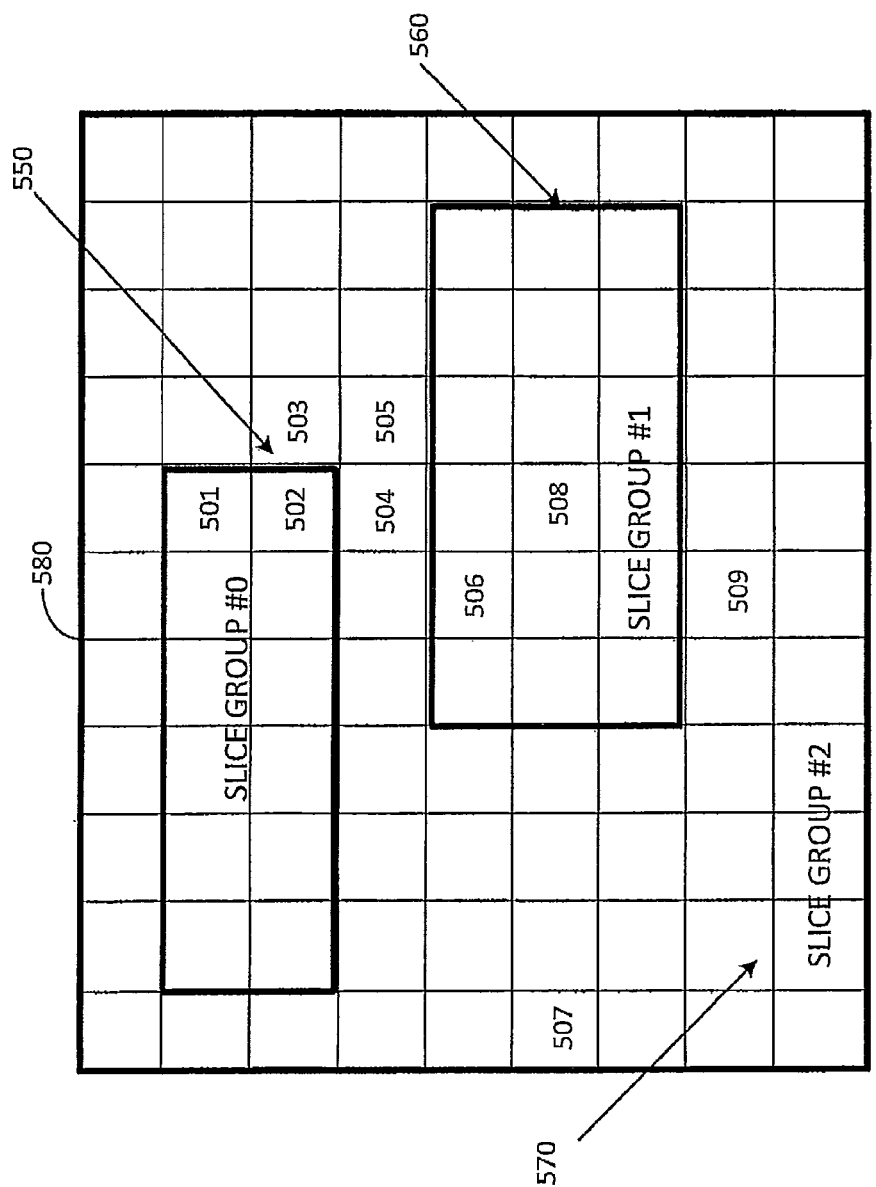
FIG. 6 illustrates another exemplary slice structure.

FIG. 6 depicts an exemplary block allocation into three slice groups: a first slice group denoted "SLICE GROUP #0" 550, a second slice group denoted "SLICE GROUP #1" 560 and a third slice group denoted "SLICE GROUP #2" 570. These slice groups 550, 560, 570, may be associated with two foreground regions and a background region, respectively, in the picture 580.

The arrangement of slices, as illustrated in FIG. 5, may be limited to defining each slice between a pair of blocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices, as illustrated in FIG. 6, is highly flexible in its arrangement but does not tend to lend itself to high efficient parallel encoding or decoding. Moreover, this highly flexible definition of slices is computationally complex to implement in a decoder.

Figure 7:
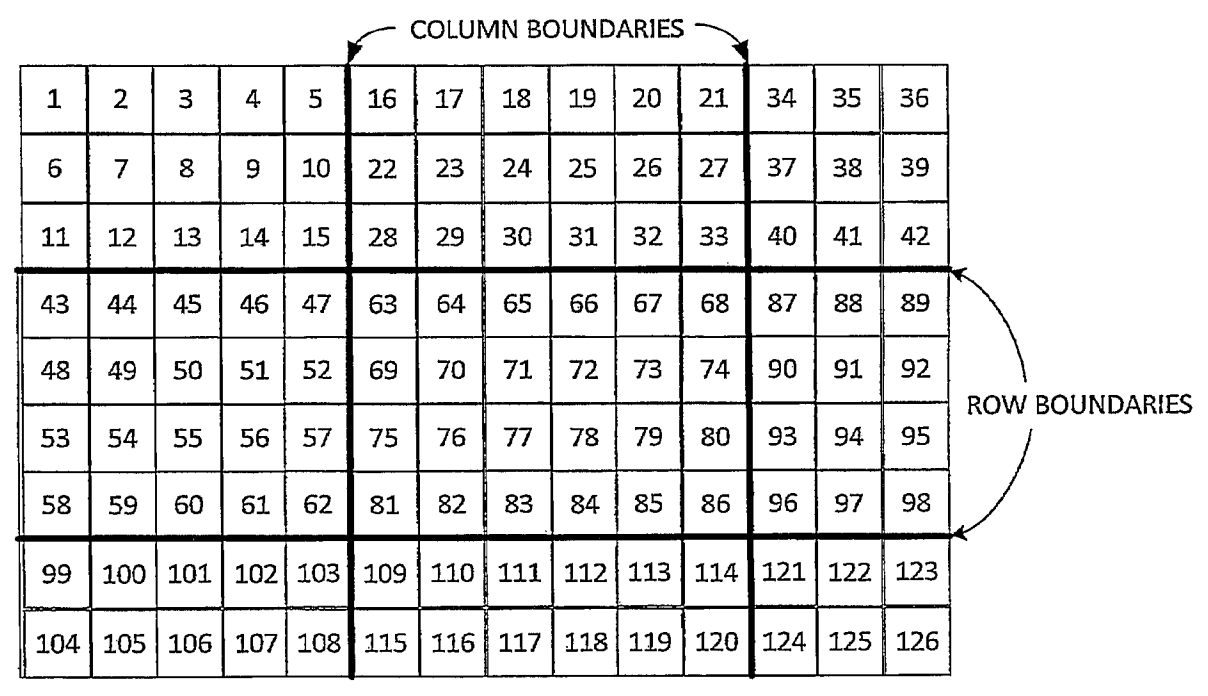

Referring to FIG. 7, a tile technique divides an image into a set of rectangular (inclusive of square) regions. The blocks (alternatively referred to as largest coding units or coded treeblocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 7. In some embodiments, blocks located in different tiles are not available for intra-prediction, motion compensation, entropy coding context selection or other processes that rely on neighboring block information.

Figure 8:
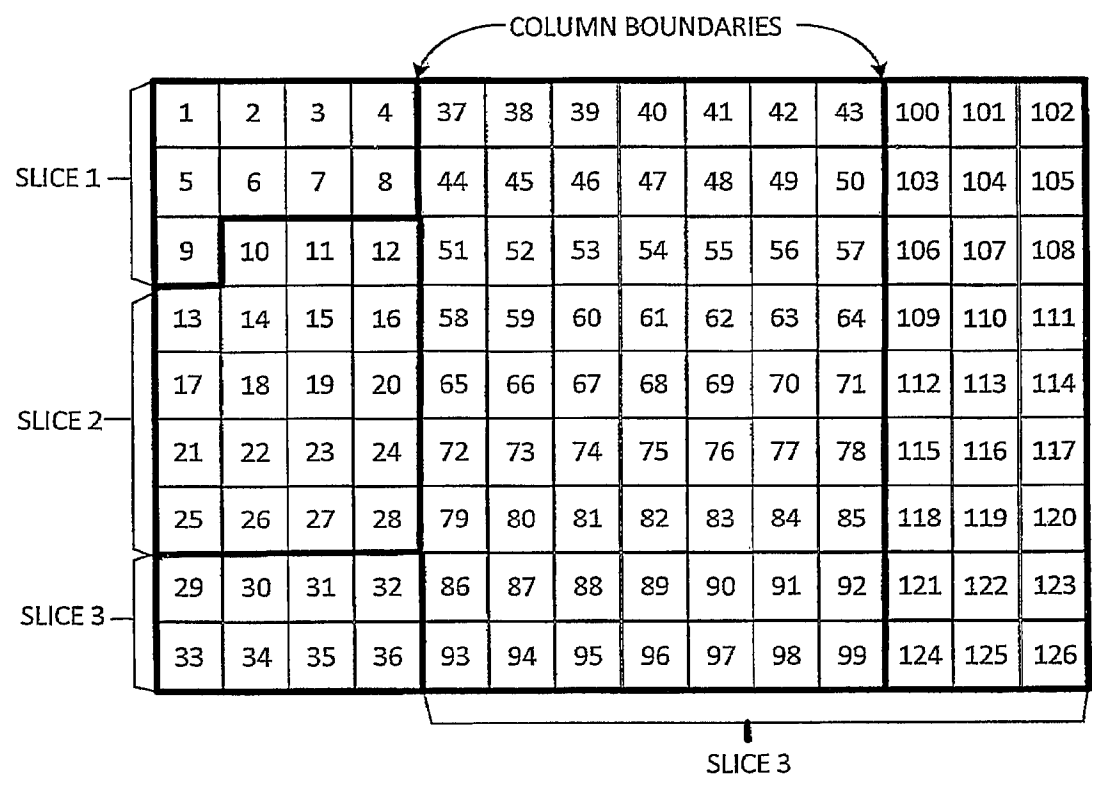

Referring to FIG. 8, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

It is to be understood that in some cases the video coding may optionally not include tiles, and may optionally include the use of a wavefront encoding/decoding pattern for the frames of the video. In this manner, one or more lines of the video (such as a plurality of groups of one or more rows of macroblocks (or alternatively coded tree blocks), each of which group being representative of a wavefront substream may be encoded/decoded in a parallel fashion. In general, the partitioning of the video may be constructed in any suitable manner.

Video coding standards often compress video data for transmission over a channel with limited frequency bandwidth and/or limited storage capacity. These video coding standards may include multiple coding stages such as intra prediction, transform from spatial domain to frequency domain, quantization, entropy coding, motion estimation, and motion compensation, in order to more effectively encode and decode frames. Many of the coding and decoding stages are unduly computationally complex.

Various scalable video coding techniques have been developed. In scalable video coding a primary bit stream (generally referred to as the base layer bitstream) is received by a decoder. In addition, the decoder may receive one or more secondary bitstream(s) (generally referred to as enhancement layer(s)). The function of each enhancement layer may be: to improve the quality of the base layer bitstream; to improve the frame rate of the base layer bitstream; and/or to improve the pixel resolution of the base layer bitstream. Quality scalability is also referred to as Signal-to-Noise Ratio (SNR) scalability. Frame rate scalability is also referred to as temporal scalability. Resolution scalability is also referred to as spatial scalability.

Enhancement layer(s) can change other features of the base layer bitstream. For example, an enhancement layer can be associated with a different aspect ratio and/or viewing angle than the base layer. Another aspect of enhancement layers is that the base layer and an enhancement layer may correspond to different video coding standards, e.g. the base layer may be MPEG-2 (Motion Pictures Experts Group 2) and an enhancement layer may be HEVC-Ext (High Efficiency Video Coding extension).

An ordering may be defined between layers. For example:
Base layer (lowest) [layer 0]
Enhancement layer 0 [layer 1]
Enhancement layer 1 [layer 2]
. . .
Enhancement layer n (highest) [layer n+1]

The enhancement layer(s) may have dependency on one another (in an addition to the base layer). In an example, enhancement layer 2 is usable only if at least a portion of enhancement layer 1 has been parsed and/or reconstructed successfully (and if at least a portion of the base layer has been parsed and/or reconstructed successfully).

The bitstream of the coded video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of decodable leading picture, coded slice of tagged for discard picture, video parameter set, sequence parameter set, picture parameter set, access unit delimiter, end of sequence, end of bitstream, filler data, and/or sequence enhancement information message. Other NAL unit types may be included, as desired.

A random access point picture (RAP) picture contains only I slices and may be a broken link access (BLA) picture, a clean random access (CRA) picture, or an instantaneous decoding refresh (IDR) picture. The first picture in the bitstream is a RAP picture.

A broken link access picture (BLA) picture is one type of RAP picture. A BLA picture contains only I slices, and may be the first picture in the bitstream in decoding order, or may appear later in the bitstream. Each BLA picture begins a new coded video sequence, and has the same effect on the decoding process as an IDR picture. However, a BLA picture contains syntax elements that, if it had been CRA picture instead, would specify a non-empty reference picture set. When a BLA picture is encountered in a bitstream, these syntax elements are ignored and the reference picture set is instead initialized as an empty set.

A clean random access (CRA) picture is one type of RAP picture. A CRA picture contains only I slices, and may be the first picture in the bitstream in decoding order, or may appear later in the bitstream. A CRA picture may have associated decodable leading pictures (DLP) and Tagged for discard (TFD) pictures.

An instantaneous decoding refresh (IDR) picture is a type of RAP picture. An IDR picture contains only I slices, and may be the first picture in the bitstream in decoding order, or may appear later in the bitstream. Each IDR picture is the first picture of a coded video sequence in decoding order.

A decodable leading picture (DLP) are leading pictures. DLP pictures are not used as reference pictures for the decoding process of trailing pictures of the same associated RAP picture.

A tagged for discard (TFD) picture are leading pictures of an associated BLA or CRA picture. When the associated RAP picture is a BLA picture or is the first coded picture in the bitstream, the TFD picture is not output and may not be correctly decodable, as the TFD picture may contain references to reference pictures that are not present in the bitstream.

A leading picture is a picture that precedes the associated RAP picture in output order.

A trailing picture is a picture that follows the associated RAP picture in output order.

The NAL unit provides the capability to map the video coding layer (VCL) data that represents the content of the pictures onto various transport layers. The NAL units may be classified into VCL and non-VCL NAL units according to whether they contain coded picture or other associated data, respectively. B. Bros, W.-J. Han, J-R. Ohm, G. J. Sullivan, and T-. Wiegand, "High efficiency video coding (HEVC) text specification draft 8," JCTVC-J10003, Stockholm, July 2012; "BoG on high-level syntax for extension planning", Ye-Kui Wang, JCTVC-J00574, July 2012; and "BoG on high-level syntax for extension planning", Ye-Kui Wang, JCTVC-J00574r1, July 2012, are hereby incorporated by reference herein in their entirety.

Referring to FIG. 9A, the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit. The next 6 bits is a "nuh_reserved_zero_6bits". The nuh_reserved_zero_6bits may be equal to 0 in the base specification of the standard. Other values of nuh_reserved_zero_6bits may be specified as desired. Decoders may ignore (i.e., remove from the bitstream and discard) all NAL units with values of nuh_reserved_zero_6bits not equal to 0 when handling a stream based on the base specification of the standard. In a scalable or other extension nuh_reserved_zero_6bits may specify other values, to signal scalable video coding and/or syntax extensions. In some cases syntax element nuh_reserved_zero_6bits may be called reserved_zero_6bits. In some cases the syntax element nuh_reserved_zero_6bits may be called as layer_id_plus1 or layer_id, as illustrated in FIG. 9B and FIG. 9C. In this case the element layer_id will be layer_id_plus1 minus 1. In this case it may be used to signal information related to layer of scalable coded video. The next syntax element is "nuh_temporal_id_plus1". nuh_temporal_id_plus1 minus 1 may specify a temporal identifier for the NAL unit. The variable temporal identifier TemporalId may be specified as TemporalId=nuh_temporal_id_plus1−1.

Referring to FIG. 10, a general NAL unit syntax structure is illustrated. The NAL unit header two byte syntax of FIG. 9 is included in the reference to nal_unit_header( ) of FIG. 10. The remainder of the NAL unit syntax primarily relates to the RBSP.

One existing technique for using the "nuh_reserved_zero_6bits" is to signal scalable video coding information by partitioning the 6 bits of the nuh_reserved_zero_6bits into distinct bit fields, namely, one or more of a dependency ID, a quality ID, a view ID, and a depth flag, each of which refers to the identification of a different layer of the scalable coded video. Accordingly, the 6 bits indicate what layer of the scalable encoding technique this particular NAL unit belongs to. Then in a data payload, such as a video parameter set ("VPS") extension syntax ("scalability_type") as illustrated in FIG. 11, the information about the layer is defined. The VPS extension syntax of FIG. 11 includes 4 bits for scalability type (syntax element scalability_type) which specifies the scalability types in use in the coded video sequence and the dimensions signaled through layer_id_plus1 (or layer_id) in the NAL unit header. When the scalability type is equal to 0, the coded video sequence conforms to the base specification, thus layer_id_plus1 of all NAL units is equal to 0 and there are no NAL units belonging to an enhancement layer or view. Higher values of the scalability type are interpreted as illustrated in FIG. 12.

The layer_id_dim_len[i] specifies the length, in bits, of the i-th scalability dimension ID. The sum of the values layer_id_dim_len[i] for all i values in the range of 0 to 7 is less than or equal to 6. The vps_extension_byte_alignment_reserved_zero_bit is zero. The vps_layer_id[i] specifies the value of layer_id of the i-th layer to which the following layer dependency information applies. The num_direct_ref_layers[i] specifies the number of layers the i-th layer directly depends on. The ref_layer_id[i][j] identifies the j-th layer the i-th layer directly depends on.

In this manner, the existing technique signals the scalability identifiers in the NAL unit and in the video parameter set to allocate the bits among the scalability types listed in FIG. 12. Then for each scalability type, FIG. 12 defines how many dimensions are supported. For example, scalability type 1 has 2 dimensions (i.e., spatial and quality). For each of the dimensions, the layer_id_dim_len[i] defines the number of bits allocated to each of these two dimensions, where the total sum of all the values of layer_id_dim_len[i] is less than or equal to 6, which is the number of bits in the nuh_reserved_zero_6bits of the NAL unit header. Thus, in combination the technique identifies which types of scalability is in use and how the 6 bits of the NAL unit header are allocated among the scalability.

While such a fixed combination of different scalability dimensions, as illustrated in FIG. 12, is suitable for many applications there are desirable combinations which are not included. Referring to FIG. 13, a modified video parameter set extension syntax specifies a scalability type for each bit in the nuh_reserved_zero_6bits syntax element. The vps_extension_byte_alignment_reserved_zero_bit is set to 0. The max_num_layers_minus1_bits indicates the total number of bits used for the syntax element in the first two bytes of the NAL unit header in FIG. 9 referred to as layer_id_plus1 or nuh_reserved_zero_6bits. The scalability_map[i] specifies the scalability type for each bit in the layer_id_plus1 syntax element. In some case the layer_id_plus1 sytax element may be instead called nuh_reserved_zero_6bits or reserved_zero_6bits syntax element. The scalability map for all the bits of the syntax element layer_id_plus1 together specifies the scalability in use in the coded video sequence. The actual value of the identifier for each of the scalability types is signaled through those corresponding bits in the layer_id_plus1 (nuh_reserved_zero_6bits) field in the NAL unit header. When scalability_map[i] is equal to 0 for all values of i, the coded video sequence conforms to the base specification, thus layer_id_plus1 value of NAL units is equal to 0 and there are no NAL units belonging to an enhancement layer or view. The vps_layer_id[i] specifies the value of layer_id of the i-th layer to which the following layer dependency information applies. The num_direct_ref_layers[i] specifies the number of layers the i-th layer directly depends on. The ref_layer_id[i][j] identifies the j-th layer the i-th layer directly depends on.

Higher values of scalability_map[i] are interpreted as shown in FIG. 14. The scalability map [i] includes the scalability dimensions of (0) none; (1) spatial; (2) quality; (3) depth; (4) multiview; (5) unspecified; (6) reserved; and (7) reserved.

Therefore each bit in the NAL unit header is interpreted based on the 3 bits in the video parameter set of what is the scalability dimension (e.g., none, spatial, quality, depth, multiview, unspecified, reserved). For example, to signal that all the bits in layer_id_plus1 correspond to spatial scalability, the scalability_map values in the VPS may be coded as 001 001 001 001 001 001 for the 6 bits of the NAL unit header. Also for example, to signal that 3 bits in layer_id_plus1 correspond to spatial scalability and 3 bits correspond to quality scalability, the scalability_map values in the VPS may be coded as 001 001 001 010 010 010 for the 6 bits of the NAL Unit header.

Referring to FIG. 15, another embodiment includes the video parameter set signaling the number of scalability dimensions in the 6 bits of the NAL unit header using the num_scalability_dimensions_minus1. The num_scalability_dimensions_minus1 plus1 indicates the number of scalability dimensions signaled through the layer_id_plus1; nuh_reserved_zero_6bits; and/or reserved_zero_6bits syntax elements. The scalability_map[i] has the same semantics as described above in relation to FIG. 13. The num_bits_for_scalability_map[i] specifies the length in bits for the i'th scalability dimension. The sum of all of the num_bits_for_scalability_map[i] for i=0, . . . num_scalability_dimensions_minus1 is equal to six (or otherwise equal to the number of bits used for layer_id_plus1; vps_reserved_zero_6bits; max_num_layers_minus1; reserved_zero_6bits; nuh_reserved_zero_6bits syntax elements).

With respect to FIG. 13 and FIG. 15 other variations may be used, if desired. In one embodiment for example, the scalability_map[i] may be signaled with u(4) (or u(n) with n>3 or n<3). In this case the higher values of scalability_map[i] may be specified as reserved for bitstreams conforming to a particular profile of the video technique. For example, scalability map values 6 . . . 15 may be specified as 'reserved' when signaling scalability_map[i] with u(4). In another embodiment for example, scalability_map[i] maybe signaled with ue(v) or some other coding scheme. In another embodiment for example, a restriction may be specified such that the scalability_map[i] values are arranged in monotonic non decreasing (or non-increasing) order. This results in various scalability dimension fields in the layer_id_plus1 field in NAL unit header being contiguous.

Another existing technique for signaling the scalable video coding using the "layer_id_plus1" or "nuh_reserved_zero_6bits" syntax element is to map the layer_id_plus1 in the NAL unit header to a layer identification by signaling a general lookup table in the video parameter set. Referring to FIG. 16, the existing technique includes a video parameter set that specifies the number of dimension types and dimension identifications for the i-th layer of the lookup table. In particular, the vps_extension_byte_alignment_reserved_zero_bit is zero. The num_dimensions_minus1[i] plus1 specifies the number of dimension types (dimension_type[i][j]) and dimension identifiers (dimension_id[i][j]) for the i-th layer. The dimension_type[i][j] specifies the j-th scalability dimension type of the i-th layer, which has layer_id or layer_id_plus1 equal to i, as specified in FIG. 17. As illustrated in FIG. 17, the dimensions that are identified include of (0) view order idx; (1) depth flag; (2) dependency ID; (3) quality ID; (4)-(15) reserved. The dimension_id[i][j] specifies the identifier of the j-th scalability dimension type of the i-th layer, which when not present is inferred to be 0. The num_direct_ref_layers[i] specifies the number of layers the i-th layer directly depends on. The ref_layer_id[i][j] identifies the j-th layer the i-th layer directly depends on. Unfortunately, the proposed embodiment illustrated in FIG. 16 results in an unwieldy large lookup table.

Referring to FIG. 18, a modified video parameter set extension includes a scalability mask that is used in combination with a scalability dimension. The scalability_mask signals a pattern of 0 and 1 bits with each bit corresponding to one scalability dimension as indicated by the scalability map syntax of FIG. 19. A value of 1 for a particular scalability dimension indicates that this scalability dimension is present in this layer (i'th layer). A value of 0 for a particular scalability dimension indicates that this scalability dimension is not present in this layer (i'th layer). For example, a set of bits of 00100000 refers to quality scalability. The actual identifier value of the particular scalability dimension that is present is indicated by the scalability_id[j] value signaled. The values of num_scalability_types[i] is equal to the sum of number of bits in the scalability_mask having value of 1. Thus $$\text{num\_scalability\_types}[i] = \sum_{k=0}^{7} \text{scalability\_mask}[i](k).$$

The scalability_id[j] indicates the j-th scalability dimension's identifier value for the type of scalability values that are signaled by the scalability_mask value.

Referring to FIG. 20, a modification of FIG. 18, includes the scalability mask being signaled outside the loop. This results in one common mask for each layer identification. Referring to FIG. 21, in this modification a corresponding exemplary video parameter set may include the scalable identification with the scalability mask not being included. In this case the syntax element scalable_id[j] has same interpretation as the syntax element scalability_id[j] in FIG. 18.

Referring to FIG. 22 a modification of FIG. 18 includes the scalability mask (scalability_mask) being signaled outside the loop. This results in one common mask for each layer identification. The scalability_mask signals a pattern of 0 and 1 bits with each bit corresponding to one scalability dimension as indicated by the scalability map syntax of FIG. 23. A value of 1 for a particular scalability dimension indicates that this scalability dimension is present in this layer (i'th layer). A value of 0 for a particular scalability dimension indicates that this scalability dimension is not present in this layer (i'th layer). For example, a set of bits of 00100000 refers to quality scalability. The actual identifier value of the particular scalability dimension that is present is indicated by the scalability_id[j] value signaled. The values of num_scalability_types[i] is equal to the sum of number of bits in the scalability_mask having value of 1. Thus $$NumScalabilityTypes[i] = \sum_{k=0}^{15} scalability\_mask(k).$$

In this case the scalability_id[j] variable may instead be called dimension_id[i][j] variable dimension_id[i][j] specifies the scalability identifier of the j-th scalability dimension of the i-th layer. Then a variable ScalabilityId[i][j] is derived as follows.

```
for( i = 1; i <= vps_max_layers_minus1; i++ ) {
    for(k=0, j=0; k<=15; k++) {
        if(scalability_mask(k)==1)
            ScalabilityId [i][k]=dimension_id[i][j++]
        else
            ScalabilityId [i][k]=0;
    }
}
```

Where the ScalabilityId [i][k] signals dimension ID for the corresponding scalability type as follows.

| k | ScalabilityId [i][k] |
|---|---|
| 0 | DependencyId[i][k] |
| 1 | QualityId[i][k] |
| 2 | depthFlag[i][k] |
| 3 | ViewId[i][k] |
| 4-15 | Reserved |

Where DependencyId[i][1] is the dependency ID for the spatial scalability dimension for the i-th layer, QualityId[i][2] is the quality ID for the quality scalability dimension for the i-th layer, depthFlag[i][3] is the depth flag/depth ID for the depth scalability dimension for the i-th layer, and ViewId[i][4] is the view ID for the multiview scalability dimension for the i-th layer.

Also in FIG. 22 avc_base_codec_flag equal to 1 specifies that the base layer conforms to Rec. ITU-T H.264 I ISO/IEC 14496-10, and avc_base_codec_flag equal to 1 specifies to HEVC. vps_nuh_layer_id_present_flag indicates if layer_id_in_nuh[i] variable which signals the value of layer_id in NAL unit header is signaled.

In another embodiment one or more of the syntax elements scalability_mask[i], scalability_mask, scalability_id [j] may be signaled using different number of bits than u(8). For example they could be signaled with u(16) (or u(n) with n>8 or n<8). In another embodiment one or more of these syntax element could be signaled with ue(v). In another embodiment the scalability_mask may be signaled in the NAL unit header in layer_id_plus1; vps_reserved_zero_6bits; max_num_layers_minus1; reserved_zero_6bits; and/or nuh_reserved_zero_6bits syntax elements. In some embodiments the system may do this only for VPS NAL units, or only for non-VPS NAL units, or for all NAL units. In yet another embodiment scalability_mask may be signaled per picture anywhere in the bitstream. For example it may be signaled in slice header, picture parameter set, video parameter set, or any other parameter set or any other normative part of the bistream.

It should be noted that FIGS. 13, 15, 18, 20, 21, 22, 23 and corresponding description refer to 6 bits since the syntax element nuh_reserved_zero_6bits or layer_id_plus1 in NAL unit header of FIG. 9 has 6 bits. However all the above description can be suitably modified if that syntax element used a different number of bits than 6 bits. For example if that syntax element (nuh_reserved_zero_6bits or layer_id_plus1) instead used 9 bits then in FIG. 13 the value of max_num_layer_minus1 bits will be 9 and the scalability_map[i] will be signaled for each of the 9 bits instead of 6 bits.

Referring to FIG. 24 a modification of FIG. 22 includes an additional flag (vps_implicit_dimension_ids_flag) indicating implicit signaling of scalability dimension identifiers and new syntax elements (max_dimension_id_minus1[i]) being signaled. vps_implicit_dimension_ids_flag with a value of 1 specifies that the explicit listing of dimension_id [i][j] values for various scalability dimensions is not signaled and the dimension_id[i][j] values are inferred. vps_implicit_dimension_ids_flag with a value of 0 specifies that the explicit listing of dimension_id[i][j] values for various scalability dimensions is signaled. max_dimension_id_minus1[i] specifies the maximum value of the dimension_id for the scalability dimension i. The scalability dimensions are listed in the scalability_mask table for example in FIG. 23.

When dimension_id values are implicitly signaled they are inferred as DimID[i][j] as described by the code below during the decoding process.

```
int Id[ ]={0,0,0,...,0};
for(i=0;i<=vps_max_layers_minus1;i++)
{
    for(j=0;j<NumScalabilityTypes;j++)
    {
        DimId[i][j]= Id[j];
    }
    Id[NumScalabilityTypes-1]= Id[NumScalabilityTypes-1]+1;
    for(k= NumScalabilityTypes-1;k>=0;k--)
    {
        if(Id[k]==(max_dimension_id_minus1[k]+1))
        {
            Id[k]=0;
            Id[k-1]= Id[k-1]+1;
        }
    }
}
```

When using the implicit signaling of scalability dimension identifiers the value of NUH layer_id is inferred to be equal to the entry index (i) of the loop for(i=0; i<=vps_max_layers_minus1;i++) in FIG. 24.

FIG. 26 shows a variant syntax with functionality similar to that of FIG. 24 syntax. All the syntax elements in FIG. 26 have the same semantic meaning as in FIG. 24. In FIG. 26 some of the syntax elements (vps_implicit_dimension_ids_flag, max_dimension_id_minus1[i]) are moved to a different position in video parameter set extension structure. It is also intended that these new syntax elements may be moved to another position in video parameter set extension or in video parameter set or in some other normative part of the bitstream. It should be noted that in FIG. 24 and FIG. 25 the syntax elements max_dimension_id_minus1[i] are signaled when vps_implicit_dimension_ids_flag has a value of 1 or TRUE. However in another embodiment the syntax elements max_dimension_id_minus1[i] may be signaled independently of the value of the vps_implicit_dimension_ids_flag syntax element.

FIG. 25 and FIG. 27 show further variant syntax with functionality similar to FIG. 24 and FIG. 26 respectively. In FIG. 25 and FIG. 27 the flag vps_nuh_layer_id_present_flag and syntax element layer_id_in_nuh[i] is signaled even when vps_implicit_dimension_ids_flag has a value of 1. In FIG. 24 and FIG. 26 the flag vps_nuh_layer_id_present_flag and syntax element layer_id_in_nuh[i] is not signaled even when vps_implicit_dimension_ids_flag has a value of 1.

FIG. 28 and FIG. 29 show further variant syntax with functionality similar to FIG. 24 and FIG. 25 respectively. In FIG. 28 and FIG. 29 additional syntax elements dimension_index_order[i] are signaled. dimension_index_order[i] specifies the order value regarding where the particular scalability dimension i is signaled when signaling dimension_id values in a contiguous syntax element. In this case when dimension_id values are implicitly signaled they are inferred as DimID[i][j] as described by the code below during the decoding process.

```
int Id[ ]={0,0,0,...,0};
for(i=0;i<=vps_max_layers_minus1;i++)
{
  for(j=0;j<NumScalabilityTypes;j++)
  {
    DimId[i][dimension_index_order[j]]= Id[j];
  }
  Id[NumScalabilityTypes-1]= Id[NumScalabilityTypes-1]+1;
  for(k= NumScalabilityTypes-1;k>=0;k--)
  {
    if(Id[k]==(max_dimension_id_minus1[k]+1))
    }
      Id[k]=0;
      Id[k-1]= Id[k-]+1;
    }
  }
}
```

FIG. 30 and FIG. 31 shows a variant syntax with functionality similar to that of FIG. 28 and FIG. 29 syntax respectively. All the syntax elements in FIG. 30 and FIG. 31 have the same semantic meaning as in FIG. 28 and FIG. 29 respectively. In FIG. 30 and FIG. 31 some of the syntax elements (vps_implicit_dimension_ids_flag, max_dimension_id_minus1[i], dimension_index_order[i]) are moved to a different position in video parameter set extension structure. It is also intended that these new syntax elements may be moved to another position in video parameter set extension or in video parameter set or in some other normative part of the bitstream.

In another embodiments the syntax element max_dimension_id_minus1 [i] can be signaled using u(v) instead of u(3). In this case the length used in u(v) coding will be equal to the value for the corresponding syntax element dimension_id_len_minus1[i]+1.

In another embodiment the syntax element dimension_index_order[i] can be signaled using u(v) instead of u(3). In this case the length used in u(v) coding will be equal to the number of bits required to signal the value of NumScalabilityTypes.

In another embodiment one or more of these syntax elements max_dimension_id_minus1[i], dimension_index_order[i] could be signaled with ue(v) or some other coding scheme.

In another embodiment various new syntax elements could be signaled at different place inside VPS.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for encoding a sequence of pictures, the method comprising:
receiving the sequence of pictures;
generating a base layer of coded pictures based on the sequence pictures;
generating at least one enhancement layer of coded pictures based on the sequence of pictures;
generating a video syntax set that includes information applicable to coded pictures including a flag indicating whether a scalability dimension identifier is signaled implicitly or explicitly, and wherein the scalability dimension identifier specifies a scalability dimension of a particular layer of coded pictures, the scalability dimension being one of multiple types, including: a spatial type and a quality type;
generating one or more network abstraction layer (NAL) units representing the base layer and the enhancement layer; and
in case the flag indicates that the scalability dimension identifier is implicitly signaled, signaling the scalability dimension identifier implicitly in a header of a NAL unit representing the enhancement layer.

2. The method of claim 1 wherein a value of 1 of the flag indicates that the scalability dimension identifier is explicitly signaled.

3. The method of claim 2 wherein the scalability dimension identifier is represented as dimension_id[i][j], where i specifies the particular layer and j specifies the scalability dimension type of the particular layer.

4. The method of claim 1 wherein a value of 0 of the flag indicates that the scalability dimension identifier is implicitly signaled.

5. The method of claim 4 wherein the scalability dimension identifier is represented as dimension_id[i][j], where i specifies the particular layer and j specifies the scalability dimension type of the particular layer.

6. The method of claim 1 further comprising including, in the video syntax, other information usable by a decoder to derive the scalability dimension identifier.

7. The method of claim 6 wherein the other information includes information about length in bits of the scalability dimension identifier.

8. The method of claim 7 wherein the length in bits of scalability dimension identifier is represented as dimension_id_len_minus1 [i].

9. The method of claim 1 wherein a syntax including if(!flag) condition is used to indicate whether a scalability dimension identifier is signaled implicitly or explicitly.

10. The method of claim 1 wherein the scalability dimension identifier specifies more than one identifier of a plurality of scalability dimension types of a layer of the coded pictures.

11. The method of claim 1, wherein the scalability dimension identifier specifies the scalability dimension as being of the quality type.

12. A non-transitory computer-readable medium for storing data representing an encoded sequence of pictures, comprising:
a bitstream written in the non-transitory computer-readable medium, the bitstream comprising a set of one or more network abstraction layer (NAL) units representing a base layer and at least one enhancement layer of the encoded sequence of pictures, the bitstream being usable by a decoder to decode the encoded sequence of pictures, and including a flag indicating whether a scalability dimension identifier is signaled implicitly or explicitly, the scalability dimension identifier specifying a scalability dimension of a particular layer of the encoded sequence of pictures, the scalability dimension being one of multiple types, including: a spatial type and a quality type,
wherein the scalability dimension identifier is implicitly signaled in a header of a NAL unit representing an enhancement layer in case the flag indicates that the scalability dimension identifier is implicitly signaled.

13. The non-transitory computer-readable medium of claim 12 wherein a value of 1 of the flag indicates that the scalability dimension identifier is explicitly signaled.

14. The non-transitory computer-readable medium of claim 13 wherein the scalability dimension identifier is represented as dimension_id[i][j], where i specifies the particular layer and j specifies the scalability dimension type of the particular layer.

15. The non-transitory computer-readable medium of claim 12 wherein a value of 0 of the flag indicates that the scalability dimension identifier is implicitly signaled.

16. The non-transitory computer-readable medium of claim 15 wherein the scalability dimension identifier is represented as dimension_id[i][j], where i specifies the particular layer and j specifies the scalability dimension type of the particular layer.

17. The non-transitory computer-readable medium of claim 12, wherein the bitstream further comprises other information usable by the decoder to derive the scalability dimension identifier.

18. The non-transitory computer-readable medium of claim 12 wherein the other information includes information about length in bits of the scalability dimension identifier.

19. The non-transitory computer-readable medium of claim 18 wherein the length in bits of scalability dimension identifier is represented as dimension_id_len_minus1[i].

20. The non-transitory computer-readable medium of claim 12, wherein the scalability dimension identifier specifies the scalability dimension as being of the quality type.

* * * * *